US008069408B2

(12) United States Patent
Morris et al.

(10) Patent No.: US 8,069,408 B2
(45) Date of Patent: Nov. 29, 2011

(54) REPRESENTING EXTENSIBLE MARKUP LANGUAGE (XML) AS AN EXECUTABLE HAVING CONDITIONAL AUTHENTICATION OR POLICY LOGIC

(75) Inventors: Cameron Craig Morris, Saratoga Springs, UT (US); Herrick Gordon Muhlestein, Orem, UT (US); Lloyd Leon Burch, Payson, UT (US)

(73) Assignee: Novell, Inc., Provo, UT (US)

( * ) Notice: Subject to any disclaimer, the term of this patent is extended or adjusted under 35 U.S.C. 154(b) by 681 days.

(21) Appl. No.: 11/600,349

(22) Filed: Nov. 16, 2006

(65) Prior Publication Data
US 2008/0120689 A1    May 22, 2008

(51) Int. Cl.
G06F 17/27    (2006.01)
(52) U.S. Cl. ............ 715/234; 715/273; 726/27; 726/28; 726/29; 726/30
(58) Field of Classification Search .......... 715/234–242, 715/273; 726/27–30
See application file for complete search history.

(56) References Cited

U.S. PATENT DOCUMENTS

| | | | |
|---|---|---|---|
| 6,185,681 B1 * | 2/2001 | Zizzi .............................. | 713/165 |
| 6,718,317 B1 | 4/2004 | Wang et al. | |
| 6,772,206 B1 | 8/2004 | Lowry et al. | |
| 6,871,233 B1 * | 3/2005 | Bearden et al. ............... | 709/226 |
| 6,941,560 B1 | 9/2005 | Lowry et al. | |
| 6,950,866 B1 | 9/2005 | Lowry et al. | |
| 6,981,212 B1 | 12/2005 | Claussen et al. | |
| 7,013,306 B1 * | 3/2006 | Turba et al. ................... | 707/101 |
| 7,072,896 B2 | 7/2006 | Lee et al. | |
| 7,076,728 B2 * | 7/2006 | Davis et al. ................... | 715/205 |
| 7,092,967 B1 | 8/2006 | Pannala et al. | |
| 7,111,062 B2 | 9/2006 | Banerjee et al. | |
| 7,134,072 B1 | 11/2006 | Lovett et al. | |
| 7,664,838 B2 * | 2/2010 | Monga et al. ................. | 709/223 |
| 7,711,647 B2 * | 5/2010 | Gunaseelan et al. ............ | 705/59 |
| 7,757,075 B2 * | 7/2010 | DeTreville .................... | 713/155 |
| 7,818,781 B2 * | 10/2010 | Golan et al. ...................... | 726/1 |
| 2002/0112224 A1 | 8/2002 | Cox | |
| 2002/0169788 A1 | 11/2002 | Lee et al. | |
| 2003/0131073 A1 * | 7/2003 | Lucovsky et al. ............. | 709/219 |
| 2004/0193459 A1 | 9/2004 | Delaney | |
| 2004/0199876 A1 * | 10/2004 | Ethier et al. .................. | 715/523 |
| 2006/0248070 A1 * | 11/2006 | Dejean et al. ..................... | 707/5 |
| 2006/0259983 A1 * | 11/2006 | Sperry ............................ | 726/28 |

OTHER PUBLICATIONS

Shari Nakano, Adobe Acrobat 7 in a Snap, Jan. 19, 2005, Sams Publishing, §§ 26, 39.*
Alfred V. Aho, Ravi Sethi, and Jeffrey D. Ullman, Compilers Principles, Techniques, and Tools, Mar. 1988, Addison-Wesley Publishing, p. 19.*

(Continued)

Primary Examiner — Doug Hutton, Jr.
Assistant Examiner — Andrew Dyer
(74) Attorney, Agent, or Firm — Schwegman, Lundberg & Woessner, P.A.

(57) ABSTRACT

Techniques for representing extensible markup language (XML) in an executable format are presented. An XML document is parsed into its components and content. The components and content are packaged as an executable. Some portions of the executable include authentication logic or policy logic that is subsequently enforced when the executable is processed. The executable is subsequently distributed to recipient machines. The machines process the executable and produce memory loaded versions of the components and content representing the XML document on the machines. The memory loaded versions of the components and content include conditionally added authentication logic or policy logic.

25 Claims, 3 Drawing Sheets

OTHER PUBLICATIONS

Tim Lindholm and Frank Yellin, The Java Virtual Machine Specification, 1999, Sun Microsystems, 2nd Edition, §§ 1.2, 3, 3.1, 5.3.*

Johnny Stenback and Andy Heninger, Document Object Model (DOM) Level 3 Load and Save Specification, Apr. 7, 2004, W3C, Abstract, § 1.3.*

Wright, Katherine, "Beginning Java: JSPs and servlets", Builder.com, builder.com.com/5100-6370-1049715.html,(May 29, 2001).

Geuer-Pollman, C, "XML Pool encryption", *Proceedings of the ACM Workshop on XML Security*, (Oct. 31, 2003), 10 pgs.

Horn, C, "Binary XML transfer using direct compilation techniques", *Experience Report and Position Paper W3C Workshop on Binary Interchange of XML Information Item Sets*, (Sep. 24, 2003), 20 ps.

Matthias, Nicola, et al., "XML Parsing: a threat to database performance", *Proceedings of the 12th ACM International Conference on Information and Knowledge Management*, (Nov. 3, 2003), 4 pgs.

Thienot, C, "Binary XML with BiM", *XML for Binary Interchange Conference*, (Sep. 24, 2004), 61 pgs.

* cited by examiner

REPRESENTING EXTENSIBLE MARKUP LANGUAGE (XML) AS AN EXECUTABLE HAVING CONDITIONAL AUTHENTICATION OR POLICY LOGIC

FIELD

The invention relates generally to data processing and more particularly to techniques for representing Extensible Markup Language (XML) data as executables, which have conditional authentication or policy logic embedded therein.

BACKGROUND

Increasingly data is being represented in a platform-independent format that it is devoid of presentation specific and environmental specific limitations. The most popular data format for this data encoding is Extensible Markup Language (XML).

With XML the content of a document is divorced from its presentation specifics. Any desired presentation formatting is applied by a recipient of the XML document using an Extensible Style Sheet's Language (XSL) template and/or the recipient processing an Extensible Style Sheet Transformation (XSLT) application.

To effectively use an XML document, a recipient's XML parser breaks the received XML document into its hierarchical components into memory as a tree structure. This internal tree structure is often referred to as a Document Object Model (DOM). Once an XML document is in a DOM format within memory, the recipient applies any XSL templates and/or XSLT applications to render the content of the document into a specific presentation within the recipient's environment.

One problem associated with this process is that the initial parsing to acquire the DOM for the XML content can be processor and memory intensive on the recipient's device. That is, the XML parser is not very efficient in processing the XML text (XML content) into the tree structure associated with the DOM representation.

Another problem is that any desired processing to enforce policy or perform authentication is typically not capable of being represented in the XML document; rather, each recipient uses its own XSLT application to apply policy or to perform authentication against or for the XML content.

Thus, what is needed is a mechanism that allows for more efficient and flexible XML document representations and XML content processing.

SUMMARY

In various embodiments, techniques for representing extensible markup language as an executable are provided. More specifically, and in an embodiment, a method is presented for generating an executable representing an XML document. An extensible markup language (XML) document is parsed to acquire components of the document and content associated with each of the components. Next, an executable is generated, which when subsequently executed by a machine reproduces each component and its associated content as a data structure that is accessible within memory of that machine. Also, the executable is modified to include one or more of the following: authentication logic and policy logic. At least some components and associated content are conditionally populated to the data structure when the machine processes the executable in response to the authentication logic or the policy logic.

DETAILED DESCRIPTION

An "executable" as used herein refers to software logic that is processed by machines (devices having memory and processing capabilities). An executable may be specific to an architecture of a particular machine, such as when it is in machine code format. Alternatively, the executable may be in an architecture-independent format, such as Common Language Interface (CLI) code format, etc. In fact, the executable may be in any byte-code format where each byte represents a word or group of words recognized by machines. Typically, an executable is optimized for memory and processor efficiency and is generally not in a format that is understandable to the human eye; rather it is understandable to machines that process the executable.

An extensible markup language (XML) document refers to a text formatted file having tags that identify structured components of the document. Each component is followed by content. The content may be references to other objects (programs, external data, data types (text, image, video, graphics, presentations, etc.)). The tags are collectively defined for the XML document via an XML schema definition (XSD).

Generally, an XML parser takes as input the XSD and the XML document and produces an in memory data structure often in a format referred to as a Document Object Model (DOM). Once an XML document is parsed and loaded as a DOM, other XML-enabled applications, such as and by way of example only extensible style sheet language (XSL) templates and extensible style sheet transformation (XSLT) applications use the DOM to render the XML content to a specific or target presentation format.

The phrase "authentication logic" refers to instructions that are represented within a produced XML executable, such that when the authentication logic is processed with the XML executable, the authentication logic enforces identity verification. The identity may be with respect to the recipient, the author or distributor of the XML executable, the author or distributor of an XML document associated with the XML executable, the resources that consume or use the XML executable, or various combinations or all of these things. An identity is an electronic indication or statement that a particular resource is who it purports to be. Identity may be resolved with any authentication technique that utilizes one or more identifiers, such as passwords, biometrics, network or device tags, user ids, confidential information, keys, digital certificates, digital signatures, etc.

The phrase "policy logic" refers to instructions that are represented within a produced XML executable, such that when the policy logic is processed with the XML executable, the policy logic enforces policy. Policy may be any conditional limitation that is interpreted, dynamically enforced, and dynamically evaluated by the policy logic.

Various embodiments of this invention can be implemented in existing network architectures, security systems, data centers, and/or communication devices. For example, in some embodiments, the techniques presented herein are implemented in whole or in part in the Novell® Access Manger® product, proxy server products, email products, operating system products, XML products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
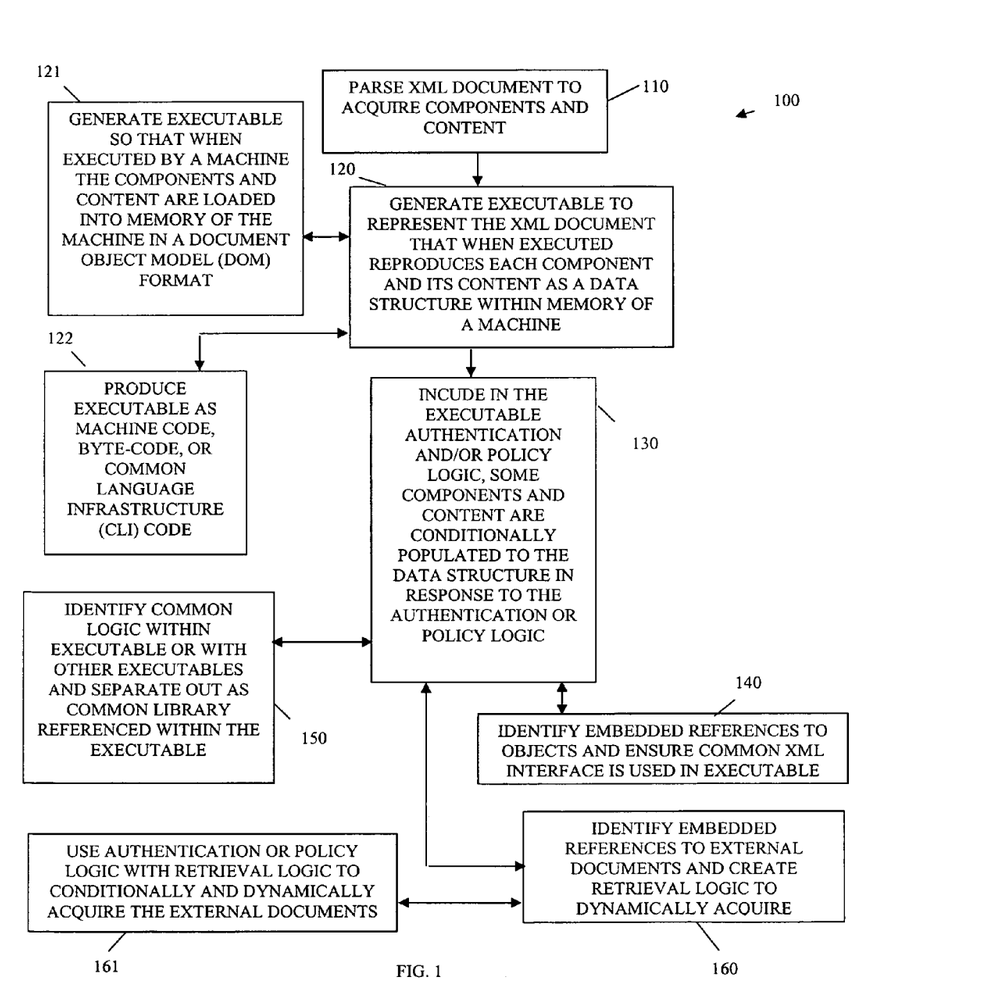
FIG. 1 is a diagram of a method for generating an executable representing an extensible markup language (XML) document, according to an example embodiment.

FIG. 1 is a diagram of a method 100 for generating an executable representing an extensible markup language (XML) document, according to an example embodiment. The method 100 (hereinafter "XML executable generation service") is implemented as instructions in a machine-accessible and readable medium. The instructions when executed by a machine perform the processing depicted in FIG. 1. The XML executable generation service may also be operational over and processed within a network. The network may be wired, wireless, or a combination of wired and wireless.

Initially, an XML document that is to be transformed or compiled into an executable is identified and acquired. This can be done in a variety of manners. For example, a graphical user interface (GUI) may permit an end-user to select, browse and select, or manually identify a file or database table that corresponds to the XML document. It may also be that the end-user supplies a database or directory search request; the results of which identify the file or database table associated with the XML document. In other cases an automated service or application may directly interact with the XML executable generation service using an Application Programming Interface (API) to supply a reference or identifier for the XML document. It can also be that the desired XML document is loaded in its entirety within a GUI and is acquired that way. The point is that the XML executable generation service receives an instruction to generate an executable for an XML document and that XML document is identified in an automated or semi-automated manner.

At 110, the XML executable generation service parses the XML document to acquire its components or structural elements and content associated with each component. It may be the case that the XML executable generation service achieves this parsing by enlisting the services of an XML parser and perhaps an XSD associated with the identified XML document. The job of the XML parser is to use the XSD to scan and identify the XML document's components and associated content.

Consider a simple example of an XML document as the following.

```
<doc>
<chapter number> 1</chapter number>
<chapter title>XML Invention</chapter title>
<text>This is a modification to XML processing</text>
</doc>
```

In the example, the components are that tags enclosed in angle brackets "<" and ">." The associated content appears in between tags. Ending tags begin with a forward slash "/."

The processing associated with the parsing scans the XML document to identify the tags (structural elements or components) and to identify the associated text for each of the tags (text following the start tags (tags without a leading "/")). A hierarchy associated with the tags may also be identified in an XSD.

At 120, the XML executable generation service generates an executable to represent the XML document and its components and content. The executable is produced such that when it is subsequently executed on a recipient's machine it produces an in memory data structure representing the original XML document's hierarchy of components and content. This permits the recipient machine to bypass the conventional parsing step of the XML document to load the XML document into a data structure. Thus, the recipient's machine experiences an increase in processor and memory efficiency, since by simply processing the executable produced by the XML executable generation service the recipient has immediate access to the components and content of the original XML document via a data structure loaded in memory.

According to an embodiment, at 121, the executable may be generated such that the data structure that it is designed to produce and populate on a recipient's machine is in a Document Object Model (DOM) format. This is what conventional XML-enabled applications would expect and access when rendering and processing an XML document. That is conventionally, a recipient would have to first parse an XML document and load the components and content into a DOM; the subsequent rendering XML applications utilize the DOM to render the XML document into a specific presentation format on the recipient's machine. With the teachings presented herein, the parsing step is bypassed and replaced by the recipient processing the executable produced by the XML executable generation service; once this is done, the DOM with the loaded components and content are immediately available to subsequent XML rendering applications.

In an embodiment, at 122, the XML executable generation service may produce the executable in a variety of desired data formats. For example, the executable may be in a machine-specific code format, a byte-code format, a common language infrastructure (CLI) code format that is machine-architecture independent, etc. Thus, the executable can be packaged for subsequent delivery to a specific target audience or to a general platform independent format.

At 130, the XML executable generation service also includes within the executable authentication and/or policy logic. This is included when the executable is generated. Although, in some cases it may be the case that a post process run against the generated executable could perform the processing of 130. The authentication logic, if present, enforces identity-based access once delivered to a specific recipient. Thus, a variety of desired identity-based restrictions and access rights may be represented within the executable via selectively inserted authentication logic. The specific identity-based restrictions that the embedded authentication logic enforces may be defined and identified in a variety of manners.

For example, the authentication may be driven by policy associated with a particular XML document, a particular target recipient that is to receive the executable, an author of the XML document, or combinations of these and other things. The policy can be acquired by the XML executable generation service via an identity service and/or via a policy data store when the executable is being generated.

In another case, the authentication limitations may be supplied based on profiles associated with resources (applications, recipients, users, services, devices, etc.) involved. In still more cases, the authentication limitations may be referenced as a file within the original XML document that the XML executable generation service dynamically acquires and evaluates. In still other cases, it may be desirable to supply enhanced XML encoding that identifies specific authentication limitations; these enhanced XML codes are recognized and processed by the XML executable generation service to produce the authentication logic.

Similar to the authentication logic and perhaps in concert with the authentication logic, the XML executable generation service may also embed policy logic when generating the executable. Again, the specific policies or policy limitations that are identified to be enforced within the policy logic may be initially acquired and resolved in manners similar to what was described above with the authentication logic. The policy logic is designed to conditionally enforce policy restrictions. These restrictions can be anything that is desired to conditionally restrict how, when, and if various components and content of the original XML document are subsequently populated to the data structure for a particular recipient. Policies can be dependent on dynamically determined conditions that exist when a recipient processes the executable, such as a condition identifying that another resource in use, etc. Policies may also be used to restrict, enforce, report, and/or log licensing conditions associated with the XML document.

In some cases, at 140, and while the XML executable generation service is generating the executable, the XML executable generation service may identify embedded references to objects (e.g., data types, programs, links, services, resources, etc.) and ensure that each of the objects are using a common interface. This ensures that when the XML document is subsequently populated to the data structure within memory of a recipient's machine that the objects (content) can properly cooperate with one another in a fashion originally intended with the XML document.

It may also be the situation, at 150, that the XML executable generation service identifies common, duplicative, or repeated logic within the generated executable or with respect to other previously generated executables. This occurs when the executable is being generated not after the fact; although in some cases it may be an optimizing post process procedure. In such cases, the XML executable generation service may separate out the common logic and store it in a common library of modules. A location where the common logic was stripped out is replaced with a reference or call to the appropriate module(s) within the common library. This can increase the compactness of the executable and facilitate reuse across multiple generated executables and may permit packages of executables to be distributed with the common library to recipient devices. In fact, the XML executable generation service may keep track of which recipients already have the common library and which do not, such that the common library only has to be distributed with the executable when the recipient is not identified as having the common library or is identified with having an out-of-date version of the common library.

In an embodiment, at 160, the XML executable generation service may also identify embedded references to external documents within the original XML document when generating the executable. This may necessitate generating retrieval logic within the executable that permits the embedded reference to be properly acquired by a subsequently receiving recipient and it also presents the opportunity to embedded conditional retrieval logic that is dynamically evaluated by the recipient's machine when the executable is executed on the machine.

Thus, at 161, the authentication and/or policy logic may be used in connection with the retrieval logic to enforce the conditional restrictions on subsequent retrieval. This can be done in a variety of manners. For example, the executable may represent the retrieval logic as a reference to a specific authentication limitation or policy limitation associated with the authentication logic and the policy logic, and if successful on the recipient's machine when the executable is processed then the external document is retrieved and populated to the data structure for use by the recipient.

The XML executable generation service produces an executable that can be processed by a recipient to produce an in memory data structure representing an original XML document's components and associated content. Additionally, authentication and policy restrictions can be configured into the executable and dynamically enforced when a machine processes the executable.

Figure 2:
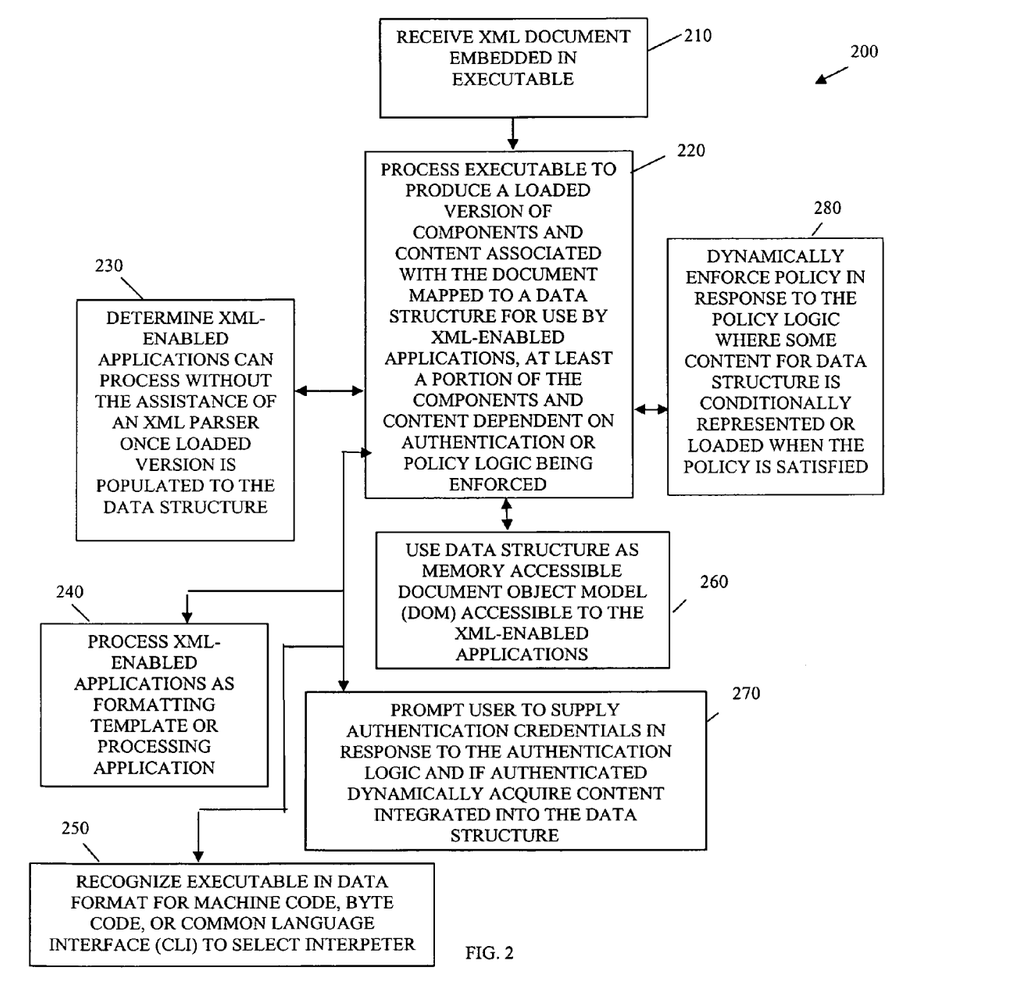
FIG. 2 is a diagram of a method for processing an executable produced by the FIG. 1, according to an example embodiment.

FIG. 2 is a diagram of a method 200 for processing an executable produced by the FIG. 1, according to an example embodiment. The method 200 (hereinafter "XML processing service") is implemented in a machine-accessible and readable medium as instructions. The instructions when executed by a machine perform the processing depicted in the FIG. 2. Moreover, the XML processing service may be operational over a network, and the network may be wired, wireless, or a combination of wired and wireless. The XML processing service executes the XML executable produced by the method 100 and discussed above within the context of the FIG. 1.

At 210, the XML processing service receives an executable. The executable represents a document in an XML format. The executable is produced in the manner discussed above with respect to the method 100 of the FIG. 1. The executable may be received by the XML generation service represented by the method 100 or may be received by another resource that acquires the executable from the XML generation service. So, the executable can be received from any resource in possession of the executable.

Moreover, the XML processing service may be viewed as a service that processes on a machine or within an environment of a recipient that is targeted to receive the XML document. The XML document is received via the executable by the XML processing service and not as a traditional text formatted document with XML encoded tags.

At 220, the XML processing service processes the executable on a machine or within an environment associated with the targeted recipient. The result of that processing is to produce a loaded version of the components and content associated with the original XML document that is mapped to a data structure. The data structure can then be accessed and consumed by XML-enabled applications to render the XML document within the machine or environment of the recipient.

Furthermore, at least a portion of the components and content are dependent upon authentication or policy logic that is embedded within the executable that is processed. So, some components and content are rendered if the authentication limitations associated with the authentication logic and/or the policy limitations associated with the policy logic are successfully enforced or satisfied when the executable is processed.

At 230, the XML processing service determines that the XML-enabled applications can begin to process once the executable produces the loaded version of the data structure for the original XML document. That is, the XML-enabled applications can execute without the assistance of a traditional pre-process step associated with an XML parser. This results in improved processing and memory throughput since the executable is optimized for machine performance and directly produces the data structure without a scanning and parsing pre-process step.

At 240, the XML-enabled applications may process once the data structure is loaded as a variety of applications, such as but not limited to formatting templates, processing applications (e.g., scripts), etc.

Additionally, at 250, the XML processing service may recognize the executable in a variety of formats and select the proper interpreter or driver service to process the executable. For example, the executable may be in a machine-specific code format, a byte-code format, or a machine-independent format, such as CLI code format, etc.

In an embodiment, at 260, the XML processing service may recognize and use the data structure as a machine memory-accessible DOM, which is immediately accessible to the XML-enabled applications once loaded by the XML processing service.

In some cases, at 270, the processing of the executable may include some interactive portions. For example, a user (recipient of the XML document) may be interactively prompted to supply authentication credentials in response to any embedded authentication logic. Thus, if the authentication logic can authenticate the user in response to the supplied credentials, some portions of the content can be dynamically integrated or acquired into the data structure. This same scenario may also be applied to some of the policy logic if present in the executable.

In another situation, at 280, the XML processing service may dynamically enforce policy in response to any policy logic embedded in the executable that is being processed. Enforcement of policy permits some content to be conditionally loaded into the data structure when the policy is satisfied. Again, some information to enforce a policy may be interactively acquired from the user (recipient). In other cases, some information may be dynamically resolved by the XML processing service based on processing environment variables or identity resolution variables associated with the machine of the user, the environment of the user, and/or the identity of the user.

Figure 3:
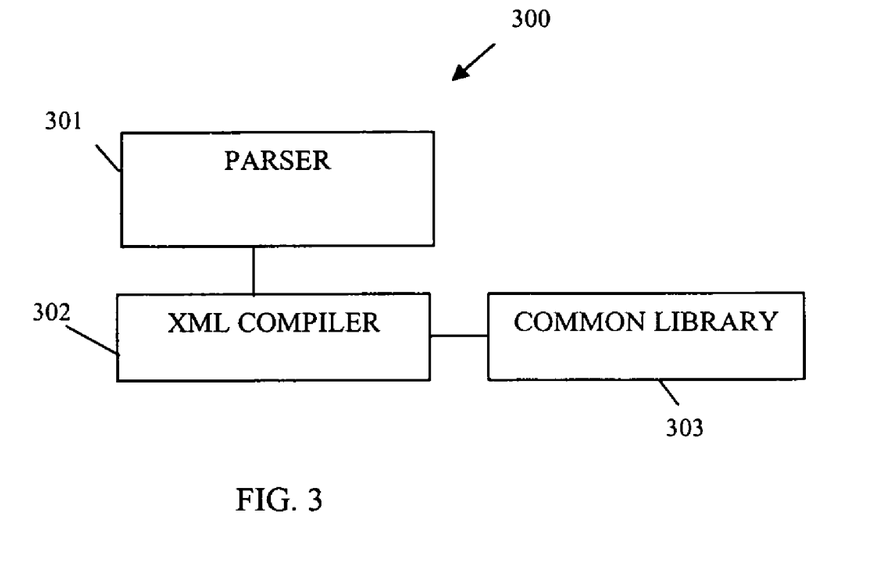
FIG. 3 is a diagram of an XML executable generation system, according to an example embodiment.

FIG. 3 is a diagram of an XML executable generation system 300, according to an example embodiment. The XML executable generation system 300 is implemented as instructions on or within a machine-accessible and readable medium. The instructions when executed by a machine perform processing depicted with respect to the method 100 of the FIG. 1. The XML executable generation system 300 may also be operational over a network and the network may be wired, wireless, or a combination of wired and wireless.

The XML executable generation system 300 includes a parser 301 and an XML compiler 302. In some cases the XML executable generation system 300 may also include a common library 303. Each of these and their interactions with one another will now be discussed in turn.

The parser 301 is used to feed components (structural or hierarchical elements of an XML document) and associated content to the XML compiler 302. The parser may be any XML-based parser or it may be modified to automatically supply authentication limitations (identity-based limitations) and/or policy limitations, which may or may not be integrated into the original XML document. In cases, where the parser 301 is not used to identify authentication and/or policy limitations, these limitations may be acquired by the XML compiler 302. Acquisition of the limitations can occur in manners discussed above with respect to the XML executable generation service represented by the method 100 of the FIG. 1.

In some embodiments, the parser 301 may also use an XSD. That XSD may also be used in some cases to identify or help resolve any authentication and/or policy limitations in addition to resolving the components and content of the XML document; although this does not have to always be the case.

The XML compiler 302 receives components and associated content associated with an XML document from the parser 301 that directly scans and parses the XML document. As was discussed above it may also be the case that the XML compiler service 302 receives the authentication and/or policy limitations from the parser 301; although as was also discussed above this can be achieved independently by the XML compiler 302.

The XML compiler 302 is adapted to translate each component and piece of associated content into an executable. The executable is produced such that it can be subsequently processed on a machine to reconstruct the each component and piece of content as a memory-accessible data structure within the machine or within an environment of the machine.

The XML compiler 302 also includes within the executable at least some authentication logic and/or policy logic. The machine that subsequently processes the executable dynamically enforces the authentication and/or policy logic to selectively determine the particular components and content that is to be loaded to the data structure within the machine or the environment of the machine.

In some cases, the XML executable generation system 300 also includes a common library 303. The common library 303 is also produced and/or managed by the XML compiler 302. The common library 303 represents repetitive, shared, or generic operations that the XML compiler recognizes as being needed in the executable and strips out as modules within the common library 303. The location within the executable that had common or shared code stripped out receives a reference call to an appropriate module within the common library 303. In some cases, the XML compiler 302 may bundle the common library 303 with the executable for subsequent delivery or storage. Alternatively, the common library 303 may not have to be included or packaged with the executable when the XML compiler 302 determines a target recipient already has an up-to-date version of the common library.

According to an embodiment, the executable may also include retrieval logic that is conditionally, dynamically, and externally used by a subsequent machine when processing the executable to selectively acquire some components and content within the data structure when the authentication and/or policy logic is processed or satisfied. In fact, the executable may actually include a call to the authentication logic and/or policy logic when it is detected that an external reference to an object is made within the content of the XML document. Resolution as to whether the object is populated into the data structure on the machine is dynamically made on the machine by enforcing the authentication (identity) and/or policy logic with the processing executable.

Again, and as was detailed above, the XML compiler 302 may produce the executable in a variety of data formats or different data formats for delivery to specific recipients or environments. Thus, the executable may be in a machine code format, a byte code format, a CLI code format, etc.

Also, the data structure that is subsequently produced on the machine at a recipient's location may be represented as a DOM.

Further, the XML compiler 302 may also be used to link to other executables to properly permit the machine to produce the data structure for the XML document. Thus, parts of the executable can reference common library 303 module executables or even other executables not directly installed in a common library 303. It may also be that the authentication logic and/or policy logic is a generic executable that can be linked and called within the executable with specific limitations as processing parameters.

Figure 4:
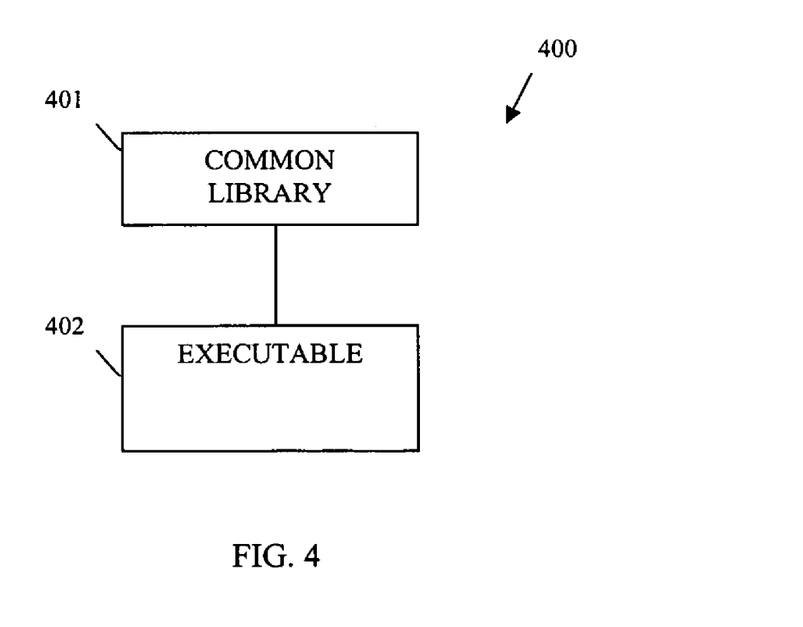
FIG. 4 is a diagram of an XML executable system, according to an example embodiment.

FIG. 4 is a diagram of an XML executable system 400, according to an example embodiment. The XML executable system 400 is implemented as instructions on or within a machine-accessible and readable medium. The instructions when executed by a machine also perform, among other things; the processing depicted with respect to the method 200 of the FIG. 2. The XML executable system 400 may also be operational over a network and the network may be wired, wireless, or a combination of wired and wireless. The XML generation system 400 uses the XML executable, which is produced as described above with the XML executable generation system 300 of the FIG. 3.

The XML executable system 400 includes a common library 401 and an executable 402. Each of these and their interactions with one another will now be discussed in turn.

The common library 401 includes modules that the executable 402 uses when it is processed on a machine. That is, the executable 402 makes reference calls to modules included in the common library 401. In some cases, authentication logic and/or policy logic may also be included within the common library 402.

The executable 402 is produced in the manners discussed above with respect to the method 100 and the system 300. Portions of the executable 402 when executed by a machine reference modules included in the common library 401. Further, when the executable 402 is processed on a machine it is adapted to produce a DOM within memory of that machine. The DOM represents the element or component hierarchy of an original XML document and the associated content. The DOM is accessible to XML-enabled applications that can also process on the machine. Moreover, at least a portion of the executable 402 includes authentication and/or policy logic that are used to conditionally populate some portions of the DOM that are being produced as the executable 402 is processed on the machine.

According to an embodiment, the executable 402 is in a machine-independent format and is handled by an interpreter or driver on the machine to properly produce the DOM.

In some cases, the authentication and/or policy logic relies on dynamically evaluated conditions, which are detected within the machine before some parts of the DOM are produced. In other cases, the authentication and/or policy logic relies on dynamic interaction with a recipient to resolve whether some parts of the DOM are produced.

The executable 402 may also include some portions that when executed by a machine is adapted to dynamically acquire external content over a network (such as the Internet or World-Wide Web (WWW), etc.) for purposes of properly producing some parts of the DOM.

It is now appreciated how XML documents may be represented in a more processing and memory efficient format (executable format) for delivery to recipients. It is also appreciated how identity-based (authentication) and policy-based limitations may be augmented into the executable to at least partially and conditionally subsequently reproduce the XML document. This provides improved control and flexibility with XML document delivery and XML document rendering.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on a machine, comprising:
   parsing, by the machine, an extensible markup language (XML) document to acquire components of the document and content associated with each of the components;
   generating, by the machine, an executable, which when subsequently executed by a machine reproduces each component and its content as a data structure that is accessible within memory of that machine; and
   including, by the machine, within the executable authentication logic and policy logic, the authentication and policy logic are supplied based on profiles of a recipient of the XML document and a machine of the recipient and some components and associated content of the xml document are conditionally populated to the data structure when the machine processes the executable in response to the authentication logic and the policy logic, the authentication logic enforces identity verification for identities associated with the recipient of the XML document, author of the XML document, author of the executable, and resources that consume or use the executable, the some components and their associated content are dependent upon authentication performed by the execution of the authentication logic and policy enforcement performed by the execution of the policy logic and the some components are dynamically resolved based on processing environment variables associated with the machine of the recipient, an environment of the recipient, and the identities of the recipient, and at least a portion of the policy logic is dependent on a particular resource being in use on the machine of the recipient and another portion of the policy logic restricts, enforces, reports, and logs licensing conditions for the XML document.

2. The method of claim 1 further comprising, ensuring, by the machine, that embedded references to objects within the XML document use a common XML interface when generating the executable.

3. The method of claim 1 further comprising, identifying, by the machine, common logic for some portions of the XML document that is common with other portions of other XML documents and separating out the common logic as a common library and replacing the common logic within the executable with references to the common library.

4. The method of claim 1 further comprising, identifying, by the machine, embedded references within the XML document to external documents and creating retrieval logic within the executable to dynamically acquire the external documents when the executable is subsequently executed by the machine.

5. The method of claim 4 further comprising, using, by the machine, the authentication logic or the policy logic with the retrieval logic to conditionally and dynamically acquire the external documents.

6. The method of claim 1, wherein generating further includes generating the executable so that when executed by the machine each component and its content are loaded into the memory in a Document Object Model (DOM) format.

7. The method of claim 1, wherein generating further includes producing the executable in one of the following formats: a machine language code format, a byte-code format, and a common language infrastructure (CLI) code format.

8. A machine-implemented method to execute on a machine, comprising:

receiving, by the machine, a document in an extensible markup language (XML) format that is embedded within an executable; and processing, by the machine, the executable to produce a loaded version of components and content associated with the document, which is mapped to a data structure for subsequent use by XML-enabled applications, and a portion of the loaded version of the components and content are dependent on execution of authentication logic and execution of policy logic being successfully enforced when the executable is processed, the authentication logic and the policy logic acquired as a file reference within the executable and the file is dynamically acquired and evaluated, the authentication logic is identity based authentication and the policy logic is dependent on dynamically determined conditions that exist when the executable is processed, the policy logic is also used to restrict, report, and log licensing conditions with the document and the portion is dynamically resolved based on processing environment variables associated with a machine of a recipient, an environment of the recipient, and an identity of the recipient and at least a portion of the policy logic is dependent on a particular resource being in use on the machine and another portion of the policy logic restricts, enforces, reports, and logs licensing conditions for the XML document.

9. The method of claim 8 further comprising, using, by the machine, the data structure as a Document Object Model (DOM) for the document, which is accessible via memory to the XML-enabled applications.

10. The method of claim 9 further comprising, processing, by the machine, one or more of the following as the XML-enabled application: a formatting template or a processing application.

11. The method of claim 8 further comprising, prompting, by the machine, a user in response to processing the authentication logic to provide authentication credentials and using the user-supplied authentication credentials to authenticate the user for dynamic content that is acquired and that is integrated into the data structure once the user is authenticated.

12. The method of claim 8, wherein receiving further includes recognizing the executable as one of the following data formats: machine code format, byte code format, or common language interface code format in order for an interpreter service to be selected to process the executable.

13. The method of claim 8 further comprising, dynamically enforcing, by the machine, policy in response to processing the policy logic, wherein at least some content associated with the data structure is conditionally represented or loaded to the data structure when the policy is determined to be satisfied.

14. The method of claim 8 further comprising, determining, by the machine, that the XML-enabled applications can be processed without the assistance of an XML parser once the loaded version is populated in the data structure.

15. A system, comprising:

a memory device;

a parser stored in the memory device and that executes on a machine; and an extensible markup language (XML) compiler stored in the memory device and that executes on the machine, the parser is to parse an XML document into components, each component associated with content, and the XML compiler is to translate each component and its content into an executable that when subsequently processed on a machine reconstructs the components and content as a memory-accessible data structure within an environment of that machine, and a portion of the executable includes authentication logic and policy logic that the machine enforces when subsequently processing the executable to selectively determine the components and content, which are loaded to the data structure within the environment of the machine, the authentication and policy logic are supplied based on profiles of a recipient of the executable and a machine of the recipient and the selective components and their content loaded to the data structure based on execution of the authentication logic and execution of the policy logic, the authentication logic including interactive portions that prompt the recipient of the executable to supply authentication credentials and to supply some information used by the policy logic and the selective components are dynamically resolved based on processing environment variables associated with the machine of the recipient, an environment of the recipient, and an identity of the recipient, and at least a portion of the policy logic is dependent on a particular resource being in use on the machine of the recipient and another portion of the policy logic restricts, enforces, reports, and logs licensing conditions for the XML document.

16. The system of claim 15 further comprising, a common library to represent portions of the executable that overlap within the executable or that overlap with other executables, wherein the XML compiler is to bundle the common library with the executable or to insert references to the common library within the portions of the executable.

17. The system of claim 16, wherein the executable is to include retrieval logic that is to conditionally, dynamically, and externally acquire some of the components and content within the data structure when the authentication logic or the policy logic is processed and satisfied on the machine with the executable.

18. The system of claim 15, wherein the XML compiler represents the executable in one of the following data formats: a machine code format associated with the machine, a byte code format, or a common language infrastructure (CLI) code format that is independent of an architecture associated with the machine.

19. The system of claim 15, wherein the data structure is represented in a Document Object Model (DOM) format.

20. The system of claim 15, wherein the parser utilizes a schema definition for the XML document to parse out the components and content and provide the components and content to the XML compiler.

21. The system of claim 15, wherein the XML compiler is to also link to other executables to properly permit the machine to produce the data structure for the XML content when the executable is to be subsequently processed on the machine.

22. A system, comprising:

a memory device;

a common library stored in the memory device and to execute on a machine; and an executable stored in the memory device and to execute on the machine, portions of the executable when processed by a machine is to reference modules included within the common library, and when the executable is processed by a machine it is to produce a Document Object Model (DOM) within memory of the machine that represents a document hierarchy for a parsed extensible markup language (XML) document, and the DOM is accessible to XML-enabled applications that can process on the machine, and a portion of the executable includes authentication logic and policy logic that is to conditionally populate some portions of the DOM that are produced based on dynamic authentication and policy evaluation, the authentication and policy logic is supplied based on profiles of a recipient of the XML document and a machine of the recipient and the authentication logic and the policy logic are identity-based and the some portions are dynamically resolved based on processing environment variables associated with the machine of the recipient, an environment of the recipient, and an identity of the recipient, and at least a portion of the policy logic is dependent on a particular resource being in use on the machine of the recipient and another portion of the policy logic restricts, enforces, reports, and logs licensing conditions for the XML document.

23. The system of claim 22, wherein the format of the executable is machine-independent and is to be processed by an interpreter service on the machine to produce the DOM.

24. The system of claim 22, wherein the authentication logic or policy logic is to rely on dynamically evaluated conditions that are to be detected within the machine before some parts of the DOM are to be produced.

25. The system of claim 22, wherein the executable includes some portions that when executed are adapted to dynamically acquire external content over a network for purposes producing some parts of the DOM.

* * * * *